United States Patent [19]

Kuntz

[11] 4,051,312

[45] Sept. 27, 1977

[54] SULFUR VULCANIZABLE INTERPOLYMERS

[75] Inventor: Irving Kuntz, Linden, N.J.

[73] Assignee: Exxon Research & Engineering Co., Linden, N.J.

[21] Appl. No.: 629,567

[22] Filed: Nov. 6, 1975

Related U.S. Application Data

[63] Continuation-in-part of Ser. No. 452,969, March 20, 1974, abandoned.

[51] Int. Cl.$^2$ .................. C08F 210/00; C08F 210/12; C08F 212/02; C08F 214/02
[52] U.S. Cl. ............................. 526/329; 204/159.24; 260/23 AR; 260/33.6 A; 260/79.5 C; 260/79.5 P; 526/141; 526/142; 526/282; 526/291; 526/293; 526/308; 526/326; 528/486; 528/490; 528/493; 528/496; 528/500
[58] Field of Search ...................... 260/79.5 C, 79.5 P; 526/282, 291, 293, 329, 326, 308

[56] References Cited

U.S. PATENT DOCUMENTS

| | | | |
|---|---|---|---|
| 2,414,803 | 1/1947 | D'Alelio | 260/84.5 |
| 3,753,959 | 8/1973 | Ichikawa et al. | 260/78.5 BB |
| 3,790,539 | 2/1974 | Onishi et al. | 260/80.7 |
| 3,814,734 | 6/1974 | Kawasumi et al. | 526/293 |
| 3,840,449 | 10/1974 | Furukawa et al. | 204/159.24 |

*Primary Examiner*—Stanford M. Levin
*Attorney, Agent, or Firm*—H. E. Naylor

[57] ABSTRACT

Sulfur vulcanizable elastomers comprise interpolymers of a major proportion of (a) one or more olefinic or haloolefinic hydrocarbons; (b) one or more esters of acrylic acid in which the acyclic or alicyclic radical moiety of the ester is free of olefinic unsaturation; and (c) a minor proportion, of about 0.10 to 10 mol percent of the total monomers present in the interpolymer, of an acyclic conjugated diolefin, prepared with a catalyst system comprising a Lewis acid, a vanadium compound and a source of free-radicals such as an organic peroxide. The polymer chain consists of segments of alternating olefin and acrylic ester monomer units of variable length interconnected by randomly distributed diolefin units and the sum of the olefin and diolefin monomers in moles is substantially equal to the sum of the acrylic esters in moles present in the interpolymer. Sulfur vulcanizates of these interpolymers exhibit high tensile, elongation and modulus and are amenable to blending with other elastomers, and compounding with fillers and reinforcing agents, or extension with process oils and plasticizers.

3 Claims, No Drawings

SULFUR VULCANIZABLE INTERPOLYMERS

CROSS REFERENCE OF RELATED APPLICATIONS

This is a continuation-in-part of U.S. application Ser. No. 452,969 filed Mar. 20, 1974, now abandoned.

BACKGROUND OF THE INVENTION

A. Field of the Invention

This invention relates to sulfur vulcanizable interpolymers of monomers comprising a major amount of one or more olefins and one or more saturated alkyl acrylates and a minor amount of one or more acyclic conjugated diolefins. More particularly, this invention relates to elastomeric terpolymers of said monomers prepared with a catalyst system comprising a Lewis acid, a vanadium compound and a source of free-radicals such as organic peroxides, ultraviolet light, high energy radiation and the like. Most particularly, this invention relates to sulfur vulcanizable terpolymers of said monomers in which the polymer backbone chain of carbon atoms consists of segments of alternating olefin and acrylate monomer units of variable length interconnected by randomly distributed conjugated diolefin monomer units; and the process for producing these particular terpolymers. Analysis of the interpolymers indicates that the mol percent of the acrylate esters and the sum of the mol percentages of the olefin and diolefin monomers present in the interpolymer are each substantially equal to 50 mol percent.

The interpolymers made by the catalyst system and process of this invention have in the uncured state an inherent viscosity in excess of 0.5 when measured in benzene or toluene at 25° C. at a concentration of 0.1 g/dl, and a glass transition temperature below 0° C. When the interpolymers of this invention are vulcanized with the aid of sulfur and accelerators the vulcanizates exhibit high tensile, elongation and modulus. They may be readily compounded with other elastomers or with fillers such as talc and reinforcing agents such as carbon blacks and extended with process oils, resins and plasticizers.

B. Prior Art

The preparation of alternating copolymers containing 50 mole percent of each monomer is old in the art as exemplified by the copolymers of styrene and maleic anhydride; and methyl vinyl ether-maleic anhydride, made with the aid of free-radical catalysts such as organic peroxides or azo compounds. Copolymers of olefins and diolefins such as isobutene, styrene and butadiene with polar monomers such as acrylonitrile, alkyl acrylates and methyl vinyl ketone cannot be prepared with cationic initiators and the free-radical initiated copolymerization of these systems of monomers is also ineffective since degradative chain transfer reactions lead to low incorporation of the olefin component in the copolymer and low molecular weight products.

Earlier work in these laboratories, described in U.S. Pat. Nos. 3,183,217, 3,278,503 and 3,426,005 showed that copolymers of high molecular weight having about 50 mole percent of each monomer could be prepared from olefinic, diolefinic and vinylic monomers such as isobutylene, 2-methyl-1-pentene, butadiene, styrene and vinyl ethers with polar monomers such as acrylonitrile, alkyl acrylates, acrolein and vinyl acetate if the polar monomer is first complexed with a Lewis acid such as zinc chloride or boron fluoride. It was also shown that the presence of organic peroxides or metal alkyl compounds enhanced the polymerization rate.

More recently, British Patent 1,187,105 based on Japanese Application 36,745, discloses the interpolymerization of olefins, polyenes and polar monomers using as a catalyst system (1) an organoaluminum (or boron) halide, $MR_nX_3-n$; or a mixture of at least two compounds having the general formula (a) $MR_nX_3-n$, (b) $M'R'_3$ and (c) $M''X_3$ or (2) an organometal halide complex prepared by contacting one of the disclosed monomers with (a) an organometallic compound of a metal of Groups IIb, IIIb, or IVb with (b) a halide of a metal of Groups IIIb or IVb, at least one of the latter (a) or (b) being a compound or aluminum or boron, and (3) an organic peroxide.

Canadian Patent 909,423 discloses blends of low unsaturated rubbers such as BUTYL rubber and EPDM with alternating copolymers of olefins and alkenyl acrylates, in which the alkenyl radical is unsaturated, either terminally or internally.

U.S. Pat. No. 3,637,611 discloses the preparation of alternating copolymers of an olefin or polyene with an $\alpha,\beta$ or $\alpha,\beta$ multisubstituted conjugated vinyl compound by first complexing the said vinyl compound with an organoaluminum or organoboron halide and then contacting the complex with the olefinic compound.

U.S. Pat. No. 3,752,788 discloses alternating multicomponent copolymers composed of at least one unsaturated ether compound as a Group ($A_1$) monomer, at least one Group ($A_2$) monomer, selected from olefins, internal olefins and polyenes; and at least one Group (B) monomer having a carbon to carbon double bond at a conjugated position to a carbonyl or nitrile group, said copolymer having a structure such that monomer units from Groups ($A_1$) and ($A_2$) always alternate with monomers from Group (B). The alternating copolymer is produced by contacting the monomers with an organoaluminum or organoboron halide.

SUMMARY

In distinction to the products and processes of the prior art I have now found that interpolymers which comprise a major proportion of (a) one or more $C_2$ to $C_{20}$ mono-olefinic acyclic or alicyclic hydrocarbons; (b) one or more $C_1$ to $C_{20}$ acyclic or alicyclic esters of acrylic acid in which the acyclic or alicyclic ester radicals are free of olefinic unsaturation; and (c) a minor proportion, of about 0.10 to 10 mol percent of the total monomers present in the interpolymer, of one or more $C_4$ to $C_{10}$ conjugated diolefins, may be prepared with the aid of a catalyst system comprised of a Lewis acid, a vanadium compound and a source of free-radicals such as an organic peroxide.

The polymer chain of carbon atoms is derived from approximately 50 mole percent of acrylate (B) monomer units and a total of approximately 50 mole percent of olefin (A) and diolefin (C) monomer units in which olefin (A) and acrylate (B) monomer units tend to alternate to form polymer segments of variable length, interconnected by randomly distributed diolefin (C) monomer units.

The essential structure of a segment of a typical polymer chain of the products of this invention may be illustrated as follows:

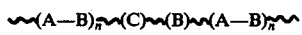

wherein n is an integer which cannot be determined with any major degree of accuracy with the analytical methods available at the present time, but for any particular macromolecule of the instant invention may be in the range of 1 to about 500. The macromolecule consists essentially of many sequences as shown above in the same polymer chain, but variations may occur to a minor extent where the diolefin (C) monomer unit may be flanked by an olefin (A) monomer unit and (A—A) and acrylate (B—B) dyads may occur but appear to be rare.

For the specific case where the olefin (A) is isobutylene, the acrylate ester (B) is ethyl acrylate; and the conjugated diolefin (C) is 1,3-butadiene, a segment of the interpolymer molecule may be illustrated as follows:

which may be Type I olefins and haloolefins having the general formula R-CH=CH$_2$ and Type III olefins and haloolefins having the general formula

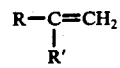

wherein R and R' are independently selected from the group consisting of halogen; hydrogen; straight and branched-chain alkyl radicals; aryl; alkylaryl; aralkyl and cycloalkyl radicals having from 1 to 18 carbon atoms and halo substituents of said radicals.

Non-limiting examples of suitable Type I olefins and haloolefins include: ethylene; propylene; 1-butene; 1-pentene; 1-hexene; 4-methyl-1-pentene; 1-heptene; 4,4-

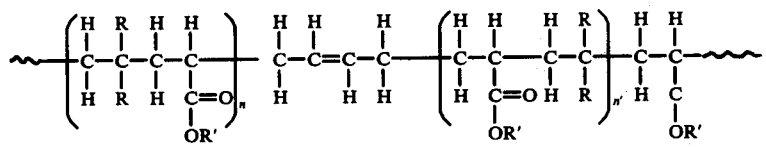

wherein R is a methyl radical, R' is an ethyl radical and n and n' is indicated above.

The number average molecular weight ($M_n$) of the interpolymers of this invention may vary in the range of about 10,000 to 700,000 depending on the particular monomers which are polymerized, the process conditions and in particular, the molar ratio of Lewis acid to vanadium compound used to effect polymerization.

The interpolymers of this invention have a wide variety of uses both in the uncured state and when crosslinked and cured as by vulcanization with sulfur, and sulfur compounds with accelerators or peroxides. When interpolymers are prepared, according to this invention from low molecular weight olefins such as ethylene, propylene and isobutylene; short chain alkyl acrylates such as methyl, ethyl, n-propyl or n-butyl acrylate; and a conjugated diolefin such as butadiene, isoprene or piperylene, and the interpolymer vulcanized by means of sulfur or sulfur compounds, elastomeric compositions are obtained which are oil and heat resistant. The same compositions may be utilized for the production of films for packaging foods and other materials of commerce.

Conversely, when the interpolymers of this invention are prepared from substantially straight-chain $C_{12}$ to $C_{20}$ alpha-olefins such as are obtained by the dehydration of straight-chain primary alcohols, or by steam-cracking deoiled paraffin wax, or by the oligomerization of ethylene as decribed in U.S. Pat. Nos. 3,441,630 and 3,629,355; or from substantially straight-chain $C_{12}$ to $C_{20}$ alkyl acrylates, or both, compositions are obtained which have a high degree of oil solubility and are active as dispersants and viscosity index improvers when incorporated in lubricating oils. Of particular utility are interpolymers in which all or part of the olefin(A) component consists of styrene or substituted styrenes. The styrene containing interpolymers have good resistance to deterioration by ultra-violet light.

DESCRIPTION OF PREFERRED EMBODIMENTS

I. Monomers

A. Olefins

Monoolefins suitable for the practice of this invention include $C_2$ to $C_{20}$ hydrocarbons and halohydrocarbons dimethyl-1-pentene; 1-octene; 1-nonene; 1decene; 3,7-dimethyl-1-octene; 1-dodecene; 1-tridecene; 1-tetradecene; 1-octadecene; styrene; 4-methyl styrene; vinyl cyclohexane; 2-vinyl norbornene; vinyl naphthalene; vinyl chloride; allyl chloride; 4-chloro-1-butene; 4-chlorostyrene; 4-chlorovinyl cyclohexane; and 4-chloroallyl benzene.

Non-limiting examples of suitable Type III olefins and haloolefins include: isobutylene; 2,3-dimethyl-1-butene, 2,4,4-trimethyl-1-pentene; 2,6-dimethyl-1-octene; 4-isopropenyl toluene; isopropenyl cyclohexane; α-methylstyrene; α-chlorostyrene; 4-chloro-α-methylstyrene; and vinylidene chloride.

The general formulae used to illustrate the types of olefins suitable for the practice of this invention are based on the Boord Classification described by Schmidt and Boord in J.A.C.S. 54,751 (1932).

B. Acrylic Esters $C_1$ to $C_{20}$ acyclic or alicyclic esters of acrylic acid in which the ester radical moiety is free of olefinic unsaturation may be illustrated by the general formula $CH_2=CH\text{-}COOR$ wherein R is selected from the group consisting of straight or branched chain primary alkyl radicals, arylalkyl radicals and cycloalkyl alkylene radicals. Non-limiting examples are: methyl; ethyl; propyl; n-butyl; isobutyl; n-amyl; hexyl; 2-ethylhexyl; n-octyl; isooctyl; derived from the oxonation of mixed heptenes followed by hydrogenation; isodecyl; 3,5,5-trimethyl hexyl; n-dodecyl; tridecyl; tetradecyl; heptadecyl; octadecyl; benzyl; and hexahydrobenzyl radicals.

C. Conjugated Diolefins $C_4$ to $C_{10}$ acylic conjugated diolefins include 1,3-butadiene; isoprene; cis and trans piperylene; 1,3-hexadiene; 2,3-dimethyl-1,3-butadiene; 3,7-dimethyl-1,3-octadiene and 3-(4-methylpentyl)-1,3-butadiene.

II Catalysts

Catalyst compositions suitable for the practice of this invention comprise, in combination, a Lewis acid, a vanadium compound and a free-radical source. While a variety of Lewis acids may be used, preferred are organoaluminum halides having the general formula Al $R_mX_n$ wherein R is a monovalent hydrocarbon radical selected from the group consisting of $C_1$ to $C_{12}$ alkyl, aryl, alkylaryl, arylalkyl and cycloalkyl radicals, $m$ is a number from 1 to 3, X is a halogen selected from the group consisting of chlorine, bromine and iodine and the sum of $m$ and $n$ is equal to three. Non-limiting examples of useful organoaluminum halides include $Et_2 Al Cl$, $Et Al Cl_2$, $Et_{1.5} Al Cl_{1.5}$ used either alone or in admixture with one another.

Useful vanadium compounds have the general formula $VO_zX_t$ wherein $z$ has a value of zero or one; $t$ has a value of 2 to 4; and X is independently selected from the group consisting of chlorine, bromine, iodine, acetylacetonates, haloacetylacetonates, alkoxides and haloalkoxides. Non-limiting examples include $VCl_4$; $VOCl_3$; $VO(OEt)_3$; $VOCl_2(OBu)$; $V(AcAc)_3$; $VO(AcAc)_2$; and $VOCl_2(AcAc)$ where (AcAc) is an acetylacetonate unit.

While free-radical generators such as ultra-violet light and high-energy radiation may be used as the source of free-radicals in the catalyst system of this invention, preferred are organic peroxides, hydroperoxides, peracids, peroxyesters and certain azo compounds. Non-limiting examples include benzoyl peroxide; lauroyl peroxide; acetyl peroxide, t-butyl peroxide, t-butyl peracetate. t-butyl peroxypivalate, cumene hydroperoxide, 2-methyl pentanoyl peroxide, dicumyl peroxide and 2,2' azo bis(isobutyronitrile).

The concentration of the individual catalyst components may be varied over a wide range depending on the reactivity of the individual monomers. Suitable mole ratios of acrylate ester per mole of organoaluminum compound may range from 1 to 2000 or higher. Preferred is a ratio of from 5 to 1500. Most preferred is a ratio of from about 10 to 1000 mols of acrylate ester per mol of organoaluminum halide compound.

The molar ratio of the organoaluminum compound to the vanadium compound may also be varied over a wide range. Usable molar ratios are from 1 to 100 mols of organoaluminum compound per mol of vanadium compound. Preferred is a range of from about 2 to 50. Most preferred is a molar ratio of from 3 to about 30 mols of organoaluminum compound per mol of vanadium compound.

The peroxide component is similarly variable over a wide range of mol ratios. Suitable ratios range from 10 to 2000 mols of acrylate ester per mol of peroxide. Preferred is a ratio of from about 20 to 1000. Most preferred is a ratio of from 30 to 500 mols of acrylate ester per mol of peroxide.

III Solvents

Suitable media for dissolving or dispersing the catalyst components and polymeric reaction products include the general group of aliphatic and aromatic petroleum hydrocarbons and halogenated hydrocarbons. Acyclic $C_8$ or lower straight or branched chain saturated hydrocarbons may be used with certain olefins and acrylate esters but $C_5$ to $C_9$ alicyclic or aromatic hydrocarbons are preferred. Halogenated hydrocarbons having from one to six carbon atoms are also useful. Choice of a particular solvent or mixture of solvents will depend on the process conditions, e.g. whether a homogeneous solution process, suspension or slurry process or cement suspension process is used.

In a homogeneous solution process for the production of a high-molecular weight interpolymer, the concentration of polymer in the cement is usually limited to a range of 5 to 10 weight percent since higher concentrations require excessive power input to insure good mixing, efficient heat exchange is difficult to achieve and the high viscosity of the solution at the temperatures which are employed causes sticking and fouling of the reactor.

In a slurry process in which the monomers and catalyst components are soluble in the solvent but in which the polymer is not, higher concentrations of polymer in the range of 10 to 20 wt. percent may be attained. Similar concentrations may be attained in a cement-suspension process in which a mixture of solvents is chosen which yields two phases; a cement phase of polymer swollen with monomers and solvent dispersed in a continuous second phase of essentially pure solvent containing a small amount of monomers. Any of the above solvent systems may be used in batch, semi-continuous of fully continuous processes.

Non-limiting examples of suitable solvents include: butane; pentane; cyclopentane; hexane; heptane; isooctane; benzene; cyclohexane; toluene; mixed xylenes; cumene; methylene chloride; dichloroethane; orthodichlorobenzene and fluorinated or chlorofluorinated $C_2$ to $C_4$ acyclic hydrocarbons. Solvents which are known to form stable complexes with any of the catalyst components, particularly the Lewis acid or the vanadium compound are undesirable and should be avoided.

IV. Process Conditions

The interpolymers of this invention may be prepared in batch, semi-continuous or fully continuous processes in which homogeneous solution, slurry, or cement-suspension systems are utilized. In a typical batch process, a reactor fitted with efficient agitation means, and means for heat exchange, is purged of air by displacement with oxygen-free nitrogen, argon or low-boiling saturated hydrocarbon vapors such as methane, ethane or propane and charged with a solvent or mixture of solvents. In all process versions monomers and catalyst components, pre-diluted with solvent if desired, may be introduced into the stirred reactor, either simultaneously or sequentially, at a rate consistent with the means used for heat-exchange to maintain the desired temperature range. Pressure on the reactor is maintained at a level sufficient to keep the reactants in the liquid phase. The catalyst components may be mixed in line in the absence of monomers before they are added to the reactor, or they may be added directly to the reactor in the presence of unreacted monomers.

Temperatures at which polymerization may be conducted may range from $-100°$ C. to $100°$ C. Preferred are temperatures in the range of $-80°$ C. to $50°$ C. Most preferred are temperatures in the range of $-40°$ C to $40°$ C. The temperature may be varied during the time required for optimum yield and polymer properties, with for example a low temperature during the initial phase of the reaction and a higher temperature during the final phase.

Reaction time may vary widely, depending on the reactivity of the particular monomers, catalyst concentration and temperature of the reaction. Generally, reaction times are shorter at higher monomer, organoaluminum and peroxide concentrations and at higher polymerization temperatures. Accordingly, polymerization times may vary from as little as two minutes to 200 hours. Preferred are reaction times in the range of from 10 minutes to 24 hours. Most preferred are reaction times in the range of 15 minutes to 10 hours.

Isolation of the interpolymer at the completion of the reaction may be accomplished in a variety of ways. In a preferred embodiment, the homogeneous polymer cement solution, or polymer suspension, or polymer cement suspension is fed from the reactor in the case of a batch process, or final reactor or holding drum in the case of a semi-continuous or fully continuous process to a mixing drum where the reaction mixture has been mixed either in line or is mixed in the drum with a quantity of a lower alcohol such as methanol, ethanol or isopropanol in order to inactivate the catalyst mixture. The alcohol may optionally contain a sequestering reagent such ethylene diamine tetra acetic acid or its disodium salt or acetylacetone. While inactivation of the catalyst in the manner indicated is preferred it is not essential and may be omitted if desired.

The polymer solution or suspension, with or without catalyst inactivation is fed to an agitated wash drum where it is mixed with a dilute aqueous solution of an acid such as hydrochloric or sulfuric acid in order to deash the polymer. Acid treatment followed by thorough water washing under efficient agitation is repeated if necessary so as to obtain a polymer with a minimal ash content.

Final isolation of the polymer in crumb form is accomplished by feeding the polymer solution or suspension to a slurry flash drum where it is treated with steam and hot water to precipitate the polymer and vaporize the solvent. Typically, antioxidants, stabilizers and slurry aids are added to the polymer solution or suspension before slurrying and removal of solvent. The water slurry of polymer is finally fed to dewatering and drying extruders before packaging in bale or crumb form. Solvent and unreacted monomers, vaporized in the slurry flash drums are purified and recycled to the polymerization reactors.

In the case of interpolymers which have been prepared from substantially straight-chain $C_{12}$ to $C_{20}$ alpha-olefins or from substantially straight-chain $C_{12}$ to $C_{20}$ alkyl acrylates, or both, the deashed solution or suspension of the interpolymer intended for use as a dispersant or viscosity-index improver may be mixed with a solvent extracted, low-pour neutral oil and a solution of the polymer in the oil obtained by solvent exchange. Concentrates prepared in this manner may be compounded with other additives such as antioxidants, pour depressants, oiliness agents and the like.

The preparation of the interpolymers of this invention and the advance over the prior art is more clearly demonstrated in the following examples.

EXPERIMENTAL

EXAMPLE 1

The polymerization was carried out in a pressure vessel which had been fabricated from a cylinder of polypropylene which had been bored to create a cylindrical cavity of 800 ml. The vessel was sealed by means of a threaded cap and oil-resistant O-ring fashioned from an acrylonitrile rubber. The polymerization vessel, contained in a dry-box from which air was excluded by means of a positive internal pressure of oxygen-free nitrogen, was charged with 200 ml. of toluene which had been purified by percolation through a column of Linde 5A molecular sieves, and 50 grams (0.5 mol) of a commercial grade of ethyl acrylate containing 15 ppm of 4-methoxyphenol as a stabilizer. The pressure vessel was then immersed in a Freon 11 (trichlorofluoromethane) bath, maintained at −20° C., located in the dry-box and after the solution had reached the lower temperature there was then added in succession to the solution 20 ml. of a 1.5 molar solution of Al Et $Cl_2$ in purified n-hexane; 2.0 ml. of a 1 molar solution of $VOCl_3$ in purified hexane; 56 grams (1.0 mol) of liquified isobutylene; 3.5 grams (0.065 mol) of liquified 1,3-butadiene and 1 mmol of lauroyl peroxide dissolved in 20 ml. of purified toluene. The vessel was sealed, removed from the Freon bath and allowed to warm to room temperature, which required about 1 hour.

The reaction vessel was then placed in a tumbling water bath maintained at 32° C. and tumbled at that temperature for a period of 90 hours. The contents were transferred to a flask, treated with efficient agitation with 15 ml. of isopropyl alcohol and 10 ml. of methanol, followed by agitation in a Waring Blender with 100 ml. of 0.5 wt. % $H_2SO_4$. After washing the polymer solution free of acid with distilled water the polymer cement was stripped with steam and hot water to remove the solvent and any unreacted monomers. The polymer was collected and dried under vacuum at a pressure of 20 torr. for 6 hours at a temperature of 60° C. The yield of interpolymer was 66 grams. The inherent viscosity ($N_{inh}$) of the polymer measured in benzene at 25° C. at a concentration of 0.1 g/dl was 1.04. No insoluble gel was observed in the solution used for the determination of the inherent viscosity.

Samples of the polymer were examined by proton NMR at 100 MHz in $C_6D_6$ solution at 80° C. and in $CDCl_3$ solution at 32° C. The molar composition was determined using the chemical shift at 4.1 ppm due to the —$OCH_2$— group of the ethyl acrylate units, the chemical shift at 0.8 ppm due to the gem-dimethyl groups of the isobutylene units, and the olefinic residue at 5.3 ppm due to the 1,4-enchained butadiene units, in the $CDCl_3$ solvent. The molar composition calculated from these data was 55 mol percent of ethyl acrylate, 39 mol percent of isobutylene and 6 mol percent of butadiene. The sum of the isobutylene and butadiene units in the polymer was 45 mol percent which is indistinguishable within the accuracy and precision of the method from 50 percent.

Based on NMR examination of ethyl acrylate-isobutylene alternating copolymers and holopolymers of the individual monomers comprising the interpolymer of this example, the detailed spectra observed for the above product of this invention are consistent with a polymer structure consisting mainly of ethyl acrylate monomer units alternating with either isobutylene units or randomly disposed butadiene units.

An infrared spectrum of the interpolymer, obtained between rock-salt plates, indicated the main structural feature as absorption in the olefin region at 970 cm$^{-1}$ due to the CH out of plane bending mode of the

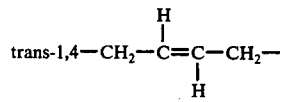

units derived from butadiene. No absorption is evident at 910 cm$^{-1}$ which would indicate $CH_2$ out of plane mode of a pendant vinyl group, nor is significant absorption evident in the 690–730 cm$^{-1}$ region which would be due to a cis-1,4-butadiene enchainment. For a discussion of infrared analysis of polybutadienes and band assignments reference may be had to J. L. Binder, J. Poly. Sci. PtA, 47 (1963) and R. R. Hampton, Anal. Chem. 21,923 (1949). The conclusion from the infrared analysis is that the butadiene in the interpolymer is enchained predominantly in the 1,4-trans fashion.

EXAMPLE 2

The interpolymer product of Example 1 was formulated on a 3 × 7 inch rubber mill with the following recipe: interpolymer 100; stearic acid 2; phenyl-β-naphthylamine 0.5; 2,2-methylene bis (4-methyl-5-tert-butyl phenol) 0.5; zinc oxide 5; sulfur 2; tetramethyl thiuram disulfide 1.5; and benzothiazyl disulfide 0.5. Pads measuring 2.5 × 1.75 × 0.025 inches were vulcanized in aluminum molds at 135° C. for 5 hours in a steam heated press under a pressure of 1200 psi on the mold. Dumbbell shaped specimens were prepared from the sheet with a 0.1 inch wide test area and tested at a 20 inch per minute strain rate on an Instron machine. The vulcanized sample showed a tensile at break of 1500 psi, an elongation at break of 245%, a modulus of 235 psi at 100% extension, and a modulus of 1045 psi at 200% extension.

EXAMPLE 3

In order to illustrate the advance of this invention over the prior art a series of runs were made in an attempt to prepare essentially the same interpolymer by the methods taught by the prior art and by the improved process of the instant invention. The same equipment, temperature and sequence of catalyst component addition and temperature for the reaction, except as noted, as was used in the preparation of the interpolymer of Example 1 was followed. The details of the experimental runs are given in Table 1. Isolation and deashing of the polymers was the same as was used for the polymer made in Example 1.

TABLE I

| Exp. Type | Prior Art | | | This Invention | |
|---|---|---|---|---|---|
| Exp. No.[a] | 3A | 3B | 3C | 3D | 3E |
| Butadiene-mols | None | 0.065 | 0.065 | 0.065 | None |
| Isoprene-mols | 0.05 | None | None | None | 0.05[c] |
| Et Al $Cl_2$-mols | 0.02 | 0.02 | None | 0.03 | 0.03 |
| $Et_{1.5}$ Al $Cl_{1.5}$-mols | None | None | 0.02 | None | None |
| $VOCl_3$-mols | None | None | None | 0.002 | 0.002 |
| Lauroyl Peroxide-mmols | 1 | 1 | 1 | 1 | 0.5 |
| Reaction Time-Hrs. | 65 | 88 | 88 | 90 | 112 |
| Reaction Temp.-° C. | 32 | 32 | 32 | 32 | 26 |
| Polymer Yield-Gms. | 73.5 | 71.2 | 75.3 | 70 | 80 |
| Inherent Viscosity[b] | 1.19 | 1.18 | 0.90 | 1.04 | 0.77 |

[a]All experimental runs contained 200 ml. of toluene. 0.5 mol of ethyl acrylate and 1.0 mol of isobutylene.
[b]Determined in benzene at 25° C. at a concentration of 0.1 g/dl.
[c]The isoprene was added in 5 equal portions over the course of 3.75 hours in order to simulate a continuous process.

Samples of the polymers were formulated on a 3 × 7 inch rubber mill with the same recipe as was used in Example 2 and vulcanized at 135° C. for 420 minutes under a pressure of 1200 psi on the mold. Dumbbells were cut from the pads and used for the following tests.

Sample 3A. This sample was very fragile and could not be evaluated for tensile on the Instron machine. Further testing showed the "vulcanized" sample to be soluble to the extent of 80% in toluene at room temperature, thereby indicating the absence of a cross-linked structure.

Sample 3B. The vulcanized sample was 47% soluble in toluene at room temperature and in the tensile test showed a yield type failure (the modulus decreased with increasing extension) indicating the absence of an elastomeric network.

Sample 3C. The vulcanized sample was 44% soluble in toluene at room temperature and in the tensile test exhibited a tensile of 545 psi at break under an extension of 310%. The modulus at 200% extension was 315 psi.

Table II gives the results obtained with Samples 3D and 3E.

TABLE II

| Vulcanizate From: | Sample 3D | Sample 3E |
|---|---|---|
| Tensile, psi at break | 2265 | 1710 |
| Elongation, % | 300 | 405 |
| Modulus (% Extension) | 955(200) | 1140(300) |

The results obtained in the tensile tests on the vulcanizates of Examples 2, 3D and 3E show that commercially acceptable vulcanizates can be obtained with the elastomeric products of this invention when they are vulcanized with sulfur and sulfur compounds. The stress-strain behavior of increasing modulus with increasing strain is characteristic of a true elastomer and is evidence that the extensive network structure has been achieved. Comparison of the products prepared according to this invention with the products prepared according to the teachings of the prior art suggest that the diolefin residues are more nearly distributed at random along the macromolecule chain in the products of this invention, which leads to their effectiveness in the vulcanization reaction to yield a three dimensional network system.

EXAMPLE 4

The same equipment and experimental procedure, except as noted, was used for the preparation of the following elastomeric interpolymer as was used for the preparation of the polymer in Example 1. The reactor contained in an oxygen-free dry-box was charged with 200 ml of purified toluene, cooled in the Freon bath to −20° C. and then fed in successive order: 0.5 mol of ethyl acrylate; 30 mmols of Et Al $Cl_2$; 2 mmols, $VOCl_3$; 1.0 mol of isobutylene; 1.0 mmol of lauroyl peroxide, and 6.5 mmols of 1,3-butadiene, added in 5 equal portions over the course of 3.3 hours. The reactor was sealed, allowed to come to room temperature and then tumbled in a water bath for 90 hours at 32° C. The polymer was deashed and isolated in crumb form in the same manner as in Example 1. The yield of polymer was 69 grams; it had an inherent viscosity of 0.86 and a glass transition temperature (TG) of −17° C.

EXAMPLE 5

The interpolymer product of Example 4 was formulated on a 3 × 7 inch rubber mill with the following recipe: interpolymer 100; HAF carbon black 50; stearic acid 2; phenyl-β-naphthylamine 0.5; 2,2' methylene bis (4-methyl-5-tert-butyl phenol) 0.5; zinc oxide 5; sulfur 2; tetramethyl thiuram disulfide 1.5; and benzothiazyl disulfide 0.5. Pads were cured at 307° F. for 45 minutes, and post-cured for 16 hours at 300° F. under a pressure of 1200 psi on the mold. Tensile tests on dumbbells cut from the pad showed the following: Tensile 940 psi; elongation 200%; modulus at 100% extension, 890 psi. The above shows that acceptable products containing carbon black may be formulated from the interpolymers of this invention.

Many variations may be introduced in the processes used to synthesize the interpolymers of this invention, particularly in a continuous process. All of the monomers and catalyst components may be fed to a first reactor which then overflows to an agitated time tank. Alternately, some of the ingredients may be blended in line before entering the reactor, or one or more of the catalyst ingredients may be mixed with one or more of the monomers in a separate vessel at a different temperature before being fed to the main reactor. Other variations with the scope of this invention will be apparent to those having skill in the art.

What is claimed is:

1. An alternating sulfur vulcanizable elastomeric interpolymer having a glass transition temperature of less than 0° C, an inherent viscosity greater than 0.5 when measured in benzene at a temperature of 20° C and concentration of 0.1 g/dl, and a number average molecular weight in the range of about 10,000 to 700,000 comprising:
   A. one or more $C_2$-$C_{20}$ acyclic or alicyclic olefins having the general formula

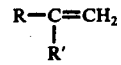

wherein R and R' are independently selected from the group consisting of chloride, hydrogen, straight and branched chain alkyl radicals, aryl, alkylaryl, arylalkyl and cycloalkyl radicals;
   B. one or more $C_1$-$C_{20}$ acyclic or alicyclic esters of acrylic acid, said esters having the general formula

wherein R is selected from the group consisting of straight or branched chain primary alkyl radicals, arylalkyl radicals and cycloalkyl alkylene radicals, and is free of olefinic unsaturation; and
   C. a minor molar proportion, about 0.10 to 10 mol percent of the total monomers present in said interpolymer, of one or more $C_4$-$C_{10}$ hydrocarbon acyclic conjugated diolefins, wherein the mol percent of the esters of acrylic acid and the sum of the mol percentages of the olefin and diolefin present in said interpolymer are each substantially equal to 50 mol percent, and wherein olefin monomer units of (A) above and acrylate monomer units of (B) above alternate to form polymer segments of variable length, interconnected by randomly distributed diolefin monomer units of (C) above and the microstructure of said interpolymer can be represented by

wherein $n$ is an integer from 1 to 500.

2. The interpolymer of claim 1 which is vulcanized with the aid of sulfur and sulfur compounds.

3. The interpolymer of claim 1 wherein the olefin is isobutylene, the acrylic ester is ethyl acrylate, and the conjugated diolefin is 1,3 - butadiene.

* * * * *